United States Patent
Coppins et al.

(10) Patent No.: US 12,321,462 B2
(45) Date of Patent: Jun. 3, 2025

(54) CYBERSECURITY RISK ASSESSMENT SYSTEM AND METHOD

(71) Applicant: Spirion, LLC, Tampa, FL (US)

(72) Inventors: Kevin T. Coppins, Lutz, FL (US); Liam Irish, Temple Terrace, FL (US); Spencer Vore, Broomfield, CO (US); Cory Retherford, Bloomington, IN (US)

(73) Assignee: Spirion, LLC, Tampa, FL (US)

( * ) Notice: Subject to any disclaimer, the term of this patent is extended or adjusted under 35 U.S.C. 154(b) by 324 days.

(21) Appl. No.: 17/987,350

(22) Filed: Nov. 15, 2022

(65) Prior Publication Data

US 2023/0153443 A1 May 18, 2023

Related U.S. Application Data

(60) Provisional application No. 63/279,251, filed on Nov. 15, 2021.

(51) Int. Cl.
*G06F 21/00* (2013.01)
*G06F 21/57* (2013.01)
*G06F 21/62* (2013.01)

(52) U.S. Cl.
CPC ........ *G06F 21/577* (2013.01); *G06F 21/6245* (2013.01); *G06F 2221/033* (2013.01)

(58) Field of Classification Search
CPC .............. G06F 21/577; G06F 21/6245; G06F 2221/033
See application file for complete search history.

(56) References Cited

U.S. PATENT DOCUMENTS

| 9,648,046 B2 | 5/2017 | Boss et al. |
| 10,326,778 B2 | 6/2019 | Gong et al. |
| 10,579,803 B1 * | 3/2020 | Mueller ................ G06F 21/577 |

(Continued)

FOREIGN PATENT DOCUMENTS

WO WO-2018084808 A1 * 5/2018 ............ G06F 11/261

OTHER PUBLICATIONS

"Guide for Conducting Risk Assessments," NIST Special Publication 800-30 Revision 1, dated Sep. 2012, Information Technology Laboratory, National Institute of Standards and Technology, Gaithersburg, MD (95 pages).

(Continued)

*Primary Examiner* — Mahfuzur Rahman
(74) *Attorney, Agent, or Firm* — Eubanks PLLC

(57) ABSTRACT

Techniques for evaluating and improving data security are provided. In one embodiment, a method includes receiving results from a sensitive data scan of information technology (IT) infrastructure of an organization, in which the result includes indications of a volume of sensitive data found during the scan, types of the sensitive data found during the scan, and locations at which the sensitive data was found during the scan. The method also includes determining a cybersecurity risk score for the IT infrastructure. This can include calculating the cybersecurity risk score based on the volume of sensitive data found during the scan, value of the sensitive data found during the scan, and vulnerability of the locations at which the sensitive data was found during the scan. Additional systems, devices, and methods are also disclosed.

15 Claims, 6 Drawing Sheets

(56) References Cited

U.S. PATENT DOCUMENTS

| | | | |
|---|---|---|---|
| 11,194,903 B2 | 12/2021 | Edwards et al. | |
| 11,238,176 B1 | 2/2022 | Vax et al. | |
| 11,503,043 B2 | 11/2022 | Sancheti et al. | |
| 11,783,062 B2 * | 10/2023 | Lounsberry | G06F 21/6218 |
| | | | 726/30 |
| 11,831,670 B1 | 11/2023 | Molls et al. | |
| 2006/0173663 A1 * | 8/2006 | Langheier | G16H 50/20 |
| | | | 703/11 |
| 2006/0195905 A1 * | 8/2006 | Fudge | G06F 11/008 |
| | | | 714/E11.02 |
| 2014/0136941 A1 | 5/2014 | Avrahami et al. | |
| 2014/0279294 A1 * | 9/2014 | Field-Darragh | H04B 5/77 |
| | | | 705/28 |
| 2018/0157842 A1 * | 6/2018 | Holz | G06F 16/338 |
| 2019/0179490 A1 | 6/2019 | Barday et al. | |
| 2019/0286839 A1 | 9/2019 | Mutha et al. | |
| 2020/0050966 A1 | 2/2020 | Enuka et al. | |
| 2020/0057864 A1 * | 2/2020 | Parthasarathy | G06F 16/24578 |
| 2020/0104046 A1 * | 4/2020 | Hopper | G06F 3/067 |
| 2020/0184104 A1 | 6/2020 | Barday et al. | |
| 2021/0037038 A1 * | 2/2021 | Alsharif | A61B 34/10 |
| 2021/0264056 A1 | 8/2021 | Irish et al. | |
| 2021/0272031 A1 | 9/2021 | Brannon et al. | |
| 2021/0350001 A1 * | 11/2021 | Alturaifi | G06N 5/04 |
| 2021/0390470 A1 * | 12/2021 | Clearwater | G06Q 10/0635 |
| 2022/0345483 A1 * | 10/2022 | Shua | H04L 9/0825 |
| 2023/0205921 A1 | 6/2023 | Irish | |

OTHER PUBLICATIONS

Cronin et al., "CIS RAM Version 1.0 Center for Internet Security Risk Assessment Method," dated Apr. 2018, Center for Internet Security, East Greenbush, NY (154 pages).

"An Introduction to the FAIR Controls Analytics Model," dated 2021, FAIR Institute, Spokane, WA (32 pages).

"Falcon Identity Protection Risk Score," dated 2022, CrowdStrike, Inc., Austin, TX (7 pages).

"An Introduction to the FAIR Materiality Assessment Model," dated 2023, FAIR Institute, Spokane, WA (11 pages).

* cited by examiner

CYBERSECURITY RISK ASSESSMENT SYSTEM AND METHOD

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

Data is essential for organizations to operate in the modern business landscape. Data is needed on their organization, their competitors, and their customers. Other data can be inadvertently collected in the process of gathering the data. Data is an ever-increasing asset, crossing traditional boundaries between on-premises and in-cloud services. It does not remain constant or stay put. In addition, low-cost storage options and the cloud are accelerating data sprawl by making it easier for companies to hold on to all their data—whether they need it or not. Organizations may take various steps for protecting data and information technology (IT) systems. Cybersecurity techniques, for example, may be used to protect networks, systems, programs, and data from digital attacks.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Certain embodiments of the present disclosure generally relate to a cybersecurity risk scoring system based on the type, volume, value or cost of loss, and potential vulnerability or likelihood of loss of sensitive data stored on IT systems within an organization. It can provide an objective, quantitative measure of the risks from loss or exfiltration of data during a cybersecurity attack, allowing the impact of preventative remediation efforts to be clearly measured. The cybersecurity risk scoring system can provide a quantitative measure of cybersecurity risk that is directly tied to the sensitive or personal data stored on IT systems. In at least some instances, it enables an accurate assessment of potential risk of the theft of data, also known as data exfiltration. This assessment can show the impact of various remediations on cybersecurity risk scores that have exceeded a preset threshold, which may include redaction of specific sensitive data, restricting access permissions for sensitive data locations, movement of sensitive data to a secure quarantine location, shredding or destruction of entire files, and encryption of sensitive data.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

Specific embodiments of the present disclosure are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Figure 1:
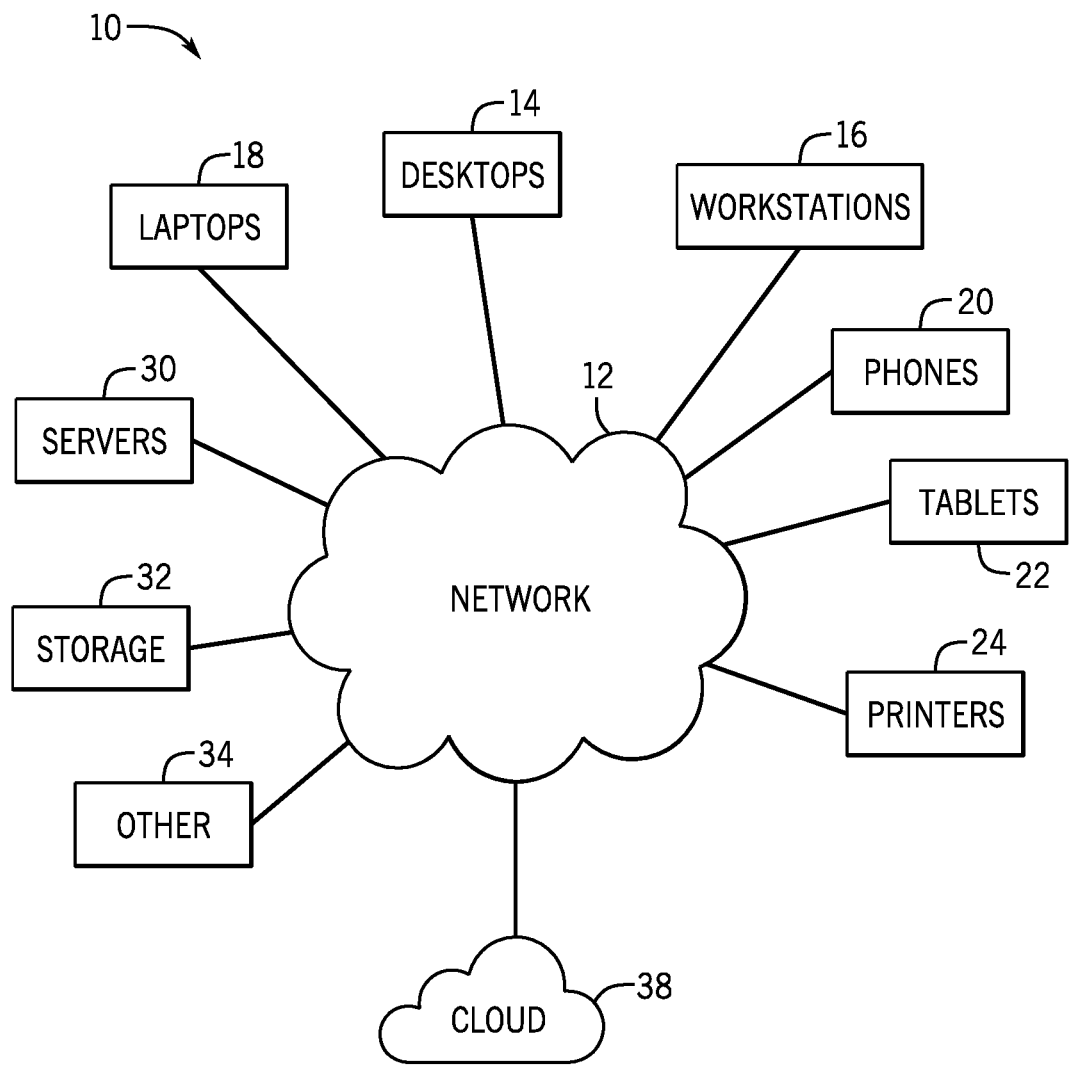
FIG. 1 generally depicts an information technology infrastructure of an organization with devices with stored data in accordance with one embodiment of the present disclosure.

Turning now to the present figures, FIG. 1 shows an example of an electronic system 10 in the form of an information technology (IT) system, such as an IT infrastructure for an organization. The system 10 includes various devices connected via a network 12. In this depicted embodiment, these devices include various endpoints, such as desktop computers 14, workstation computers 16, laptop computers 18, phones 20, tablets 22, and printers 24. The system 10 can also include servers 30 (e.g., infrastructure servers, application servers, or mail servers), storage 32 (e.g., file servers, database servers, other storage servers, relational database systems, or network attached storage), and other networked devices 34. Still further, in at least some instances, the network 12 is connected to various cloud resources 38. Various devices of the system 10 may be local or remote and can communicate with other devices via any suitable communication protocols. The devices of system 10 can store a large amount of data, some of which may be sensitive information.

Certain existing cybersecurity risk frameworks are based on subjective, qualitative scales and on users correctly interpreting and consistently applying textual descriptions of contributing risk factors. These solutions fail to provide a risk measurement directly tied to value and volume of sensitive data that would be lost in a data theft or rendered inaccessible due to a ransomware attack. If there is an incorrect interpretation or inconsistent application of rating factors between users or instances of using these subjective rating frameworks, they can fail to produce comparable risk assessments to identify time-based trends or compare results between IT systems.

Figure 2:
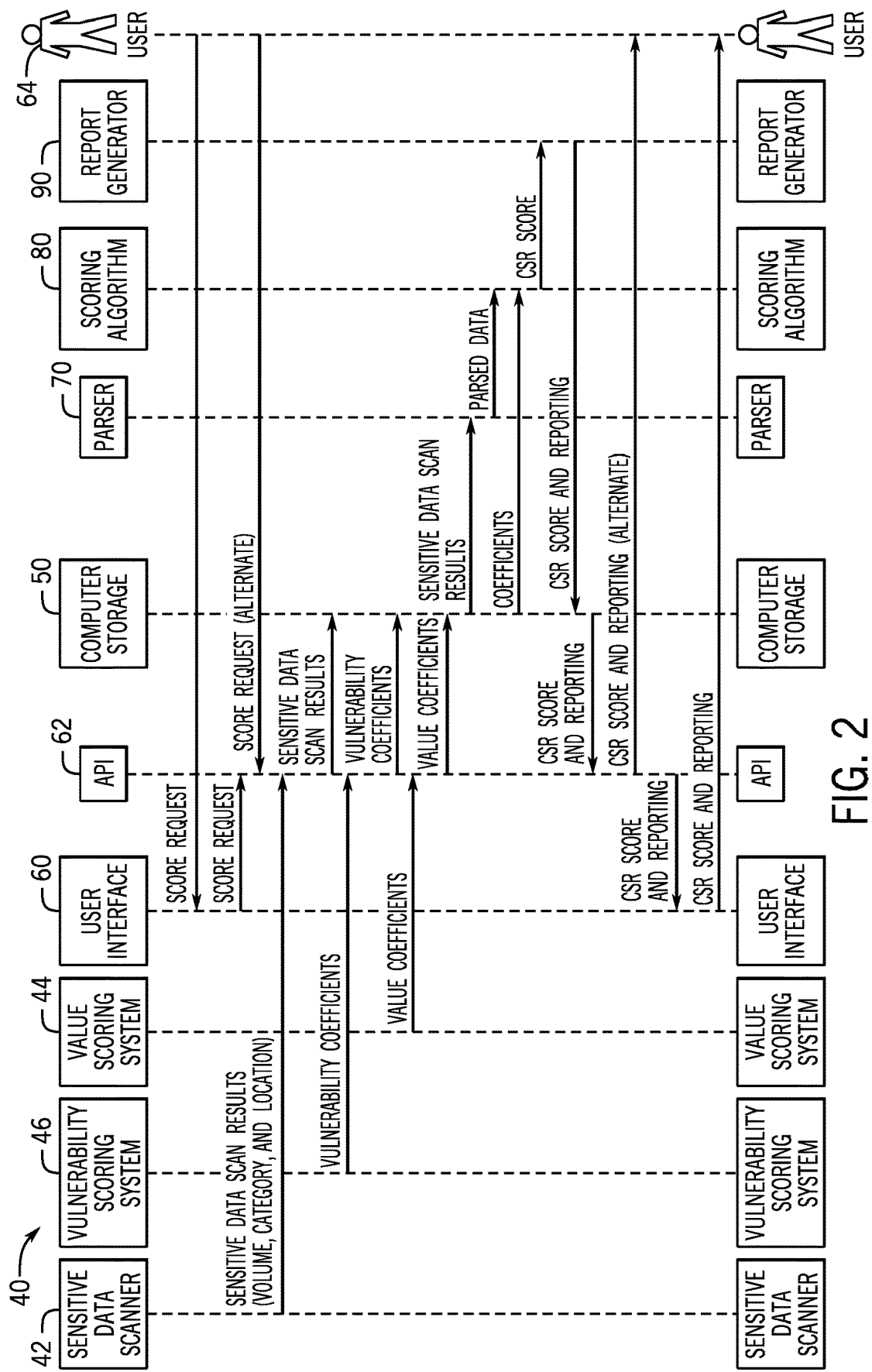
FIG. 2 is a diagram depicting components and operation of a cybersecurity risk scoring system in accordance with one embodiment.

By way of example, and as shown in FIG. 2, a cybersecurity risk scoring system 40 is a computerized information system that computes a quantitative score. This score estimates the risk of exfiltration, theft or loss of access to sensitive and restricted data on an organization's IT infrastructure. An input to the system 40 is sensitive data scan results from a sensitive data scanner 42 that scans data locations for sensitive data, which may be any data that a customer, user, or organization wants to keep private or could cause harm if known publicly. In some instances, sensitive data includes personally identifiable information (PII), for example, Social Security numbers, driver's license numbers, addresses, telephone numbers, or other personal information. Sensitive data may also include other types of information, such as personal health information (PHI), trade secrets, privileged documents, non-public financial information (e.g., corporate financial information that could be used for insider trading), or other confidential information. The sensitive data scanner 42 is a tool that scans the data storage of IT systems for sensitive data, such as PII. The sensitive data scanner 42 can be a tool provided by Spirion® (such as Spirion's Sensitive Data Manager or Sensitive Data Platform) or by some other party.

In some embodiments, the sensitive data scan results can be categorized based on relevant classifications, such as Public, Confidential, Restricted, and Top Secret. Further, in at least some of these embodiments, the value and count of the sensitive data may be based on these classifications rather than the individual datatypes. These classifications are then used to determine the value of the sensitive information, rather than the datatypes.

A Value coefficient can be assigned to each datatype or classification and can be determined in any suitable manner. In some embodiments, the values are determined by a value scoring system 44, which can be a plug-in system, methodology, or tool that will help determine how much different types of PII or other sensitive information are worth. For example, social security numbers could be weighted with a scalar 20, license numbers could be weighted with a 10, dates of birth could be weighted with a 3, and customer telephone numbers could be weighted with a 2. That is, a sliding scale of weights may be used to normalize the values based on value (e.g., sensitivity) of the data. These weights may be specified by the organization or default weights (e.g., industry standards or risk management scoring systems) may be used. In some instances, values may be either a monetary value representing the direct and intangible costs to the organization or a scalar value that is comparable between datatypes or classifications.

Figure 5:
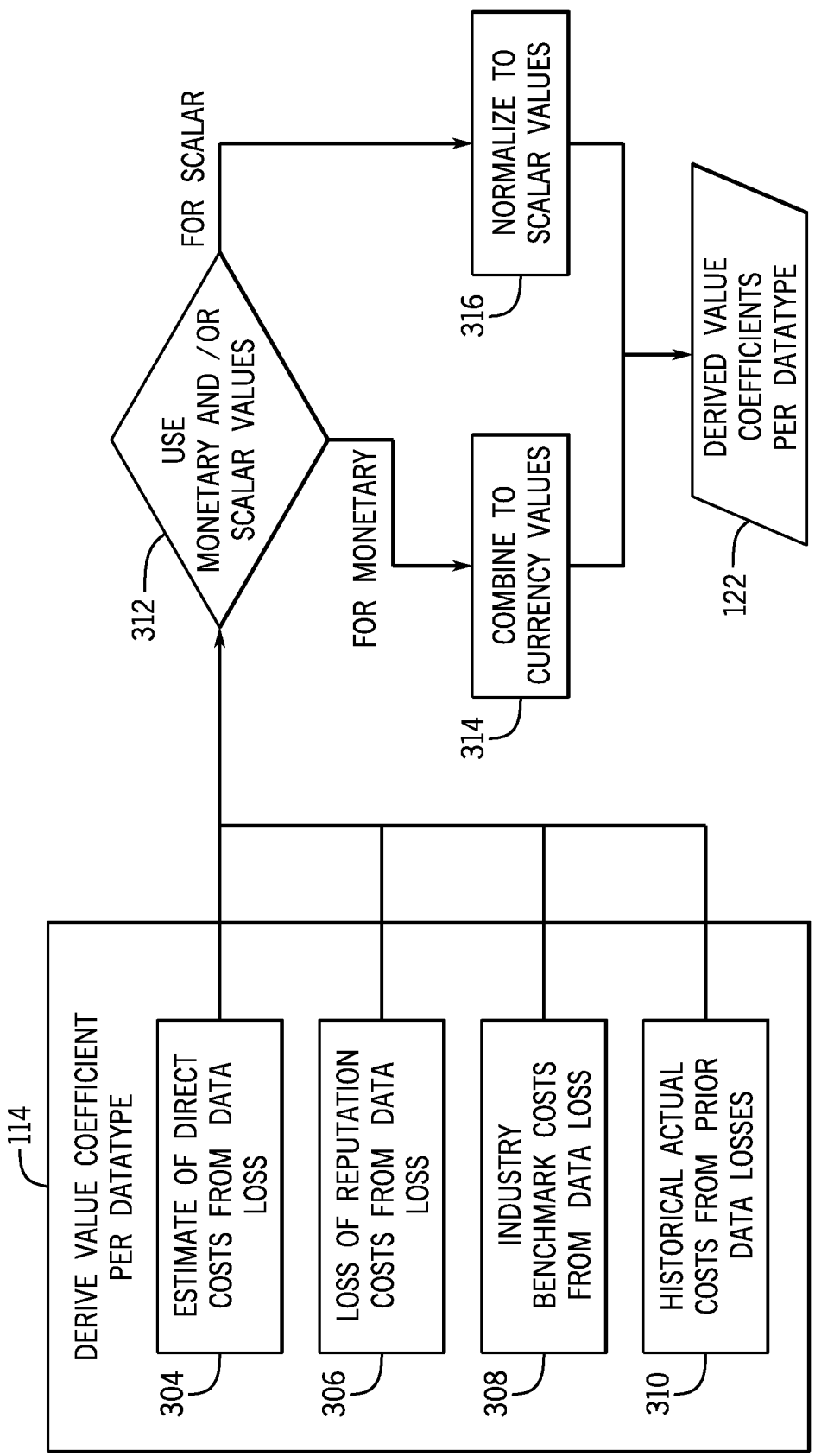
FIG. 5 is a diagram representing determination of value coefficients for assessing cybersecurity risk in accordance with one embodiment.

One example of determining Value coefficients is generally represented in FIG. 5 in accordance with one embodiment. In this example, the Value coefficients for datatypes are determined by a user or the system from one or a combination of sources of value measurements, which may include estimates of direct costs from data loss 304, loss of reputation costs from data loss 306, industry benchmark costs from data loss 308, and historical actual costs from prior data losses 310. Either or both of monetary and scalar values could be used (block 312). For monetary values, contributing costs can be combined (block 314) to get a single cost per datatype. For scalar values, costs are normalized (block 316) to scalar values relative to the scalar values of other datatypes or based on other weighting or ranking scales. The derived Value coefficients 122 may be stored for later use.

The data location, identifying the device or system on which the pieces of identified sensitive data were found, can be, for instance, the name of a workstation, a database, or a cloud-hosted data repository, such as Microsoft SharePoint™ or an Amazon S3™ bucket. It could also or instead be other types of computerized data storage systems or products.

Figure 4:
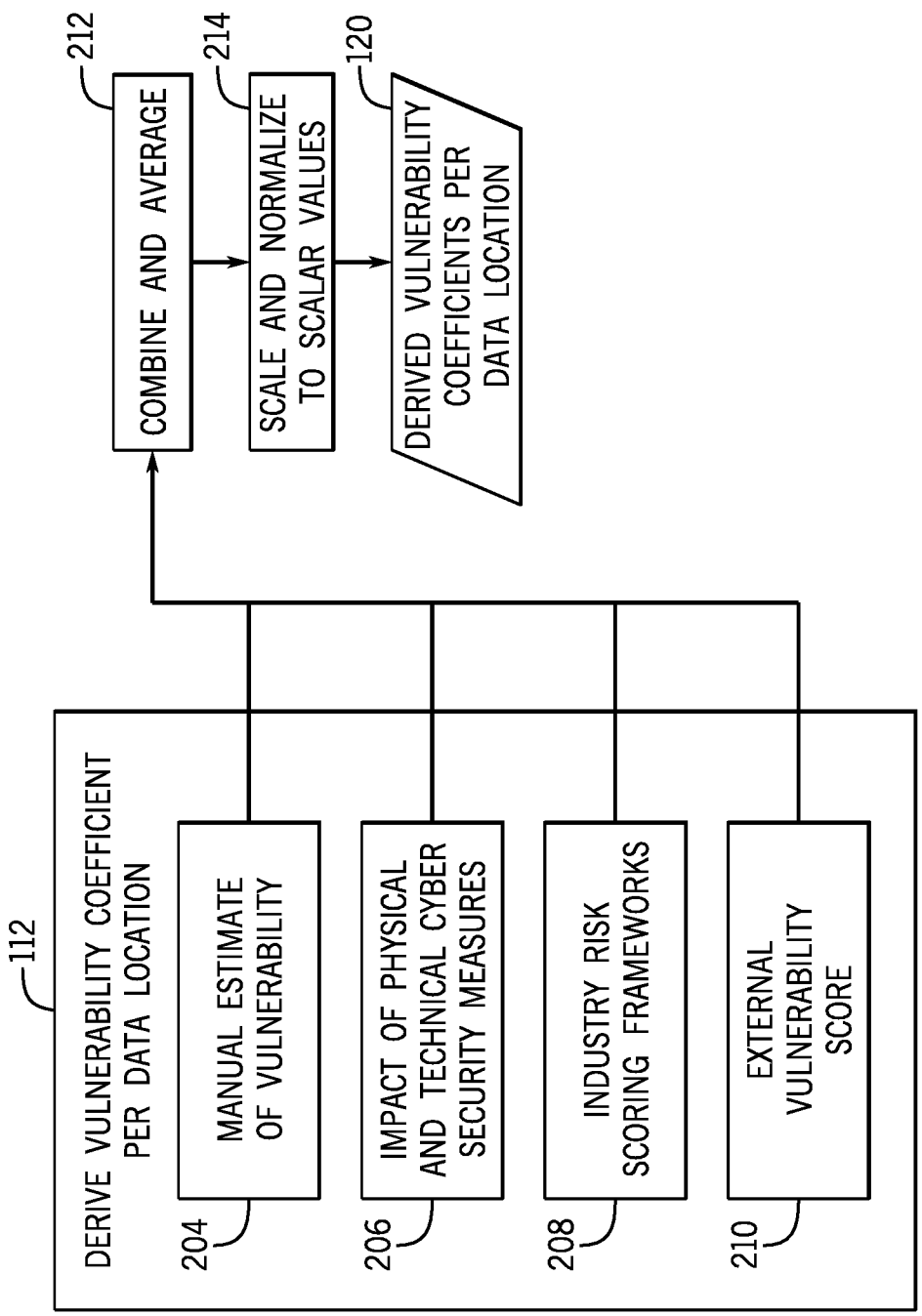
FIG. 4 is a diagram representing determination of vulnerability coefficients for assessing cybersecurity risk in accordance with one embodiment.

Each data location can be assigned a Vulnerability coefficient based on its relative likelihood or probability of the data location being attacked or compromised to allow unauthorized sensitive data exfiltration when compared to other data locations. These Vulnerability coefficients can be determined in any suitable manner, such as generally depicted in FIG. 4. In some embodiments, the Vulnerability coefficients are determined by an external vulnerability scoring system 46 (FIG. 2), which can be a plug-in system, methodology, or tool that will help identify how vulnerable the different systems on which PII is found are. This could be based on one or more sources of vulnerability measurement, such as manual estimates of vulnerability 204 relative to other data locations; impact of physical or technical cyber security measures 206 on the data location; a risk scoring framework 208, such as CIS RAM™ or FAIR™; an external vulnerability score 210 obtained from an assessment tool such as CrowdStrike Falcon® ZTA score; or some other product or method. As depicted in FIG. 4, the vulnerability metrics can be combined and averaged (block 212), and the resulting average vulnerabilities for a data location can be scaled and normalized (block 214) to produce Vulnerability coefficients 120, which may be stored for later use.

Inputs, such as the volume of a specific sensitive and restricted datatype in the scan results from the sensitive data scanner 42, Vulnerability coefficients from the vulnerability scoring system 46, and Value coefficients from the value coefficient scoring system 44, may be stored in any suitable computer storage 50, such as a local storage system or a cloud-based storage system. In one instance, the computer storage 50 may include a combination of a cloud-based object storage solution and a relational database management system (e.g., Postgres). As also shown in FIG. 2, the system 40 can include a user interface 60 and an application programming interface (API) 62. The user interface 60 can serve as a front end, such as a web graphical user interface (GUI), that a user 64 can use to control and interface with the system 40. The API 62 can serve as a backend interface. The user interface 60 can use the API 62 to interact with and control operation of the system 40. In some instances, a user 64 could also or instead interact directly with the API 62.

The user 64 is a human user in at least some instances, but in other cases the user 64 may be an automated process that controls the system.

In some embodiments, the system 40 will load and parse out the data from the input sensitive data scan results. The parser 70 of FIG. 2 may be provided as any suitable software that takes the sensitive data scan results from the sensitive data scanner 42 and parses them into a format that is understandable by scoring algorithm software 80, which also receives the Vulnerability and Value coefficients noted above. The system 40 can then calculate a cybersecurity risk (CSR) score for each piece of sensitive data according to the categories provided and multiply the number of sensitive data occurrences by the weighting coefficient corresponding to that categorial label rather than to a specific datatype. Then, once the coefficients are multiplied for each unique categorial group of PII (or other sensitive data) occurrences, the system 40 can sum and average the results from each piece of PII (or other sensitive data) into a cumulative CSR score. The resulting CSR score will contain information regarding the volume as measured by the number of occurrences in each sensitive datatype or category, the value as determined by the coefficients that weight the sensitive datatype, and the vulnerability as determined by the coefficients for each system in the organization's network. In contrast to qualitative risk assessments, the CSR score can be a numerical score that is a quantitative risk assessment based on each of sensitive data value, which may consist of either scalar or monetary coefficients, volume, and vulnerability. The scoring algorithm software 80 can also provide metrics related to the determined CSR score. The API 62 can be used to collect the coefficients from other systems and execute this process.

In addition, the raw CSR score can be further scaled to produce a final CSR score. In some instances, the system 40 will scale the raw CSR score into an adjusted raw CSR score by dividing the raw CSR score by a divisor. This divisor can be a metric representing the fraction of the organization's entire data volume scanned. This may result in higher CSR scores calculated when less of an organization's entire stored data volume is scanned by the sensitive data scanner 42. This may be a desired alteration to the CSR scoring system in some cases, as there is additional risk and uncertainty when only a portion of an organization's data has been scanned.

Once the raw adjusted CSR score is determined, it can be scaled onto a different range using an equation. For example, the system can take the logarithm of the adjusted raw score and then input the result from that logarithm into a sigmoid function. The equations and their outputs can be adjusted into an appropriate score range by using scaling coefficients and/or by changing the underlying structure of the math.

After this final score is calculated, the system 40 can output the results into a reporting tool. More particularly, a report generator 90 can take scores and metrics produced by the scoring algorithm and produce a user-readable report. In one instance, the report generator is a portable document format (PDF) generator that copies the scores into a formatted PDF file. But the report generator could also or instead have other output formats, such as an interactive web interface, a spreadsheet, other file formats, and so forth. Any or each of the report, the scores, or the metrics produced may also or instead be stored in the computer storage 50.

In at least some instances, the system 40 gives a user 64 flexibility to interface with other systems via its API 62 and data interfaces, such as the sensitive data scanning tool 42 and/or any other analysis methodology to determine how much value should be assigned to a particular sensitive datatype. Different organizations will have different needs or different risk profiles, and in at least some embodiments the system's flexibility allows an organization to adjust this framework to their specific needs. The sensitive data and weighting coefficient inputs can be acquired in any suitable manner, while the system 40 provides a framework to integrate a wide range of specific systems that specialize in one specific angle of risk score calculations and can integrate different contributors to risk from more specialized methods, such as value or vulnerability, into a single combined risk score. And while sensitive data and weighting coefficients may be used as inputs, the system 40 may also or instead integrate other data, such as data from other sources, into the risk scoring technique described herein.

Although a single CSR score can be output in some cases, in other instances the system 40 may output a range of CSR scores to represent a range of different scenarios, such as from best case to worst case, to account for uncertainty in the inputs to this system. The system 40 may, for example, use a Monte Carlo style simulation process to calculate a range of different CSR scores between the allowable range for the Value and Vulnerability coefficients.

In some instances, the Vulnerability coefficient can also be modified if the user identifies additional risk factors and coefficients that appropriately model their organization's security posture for a specific data location. In one embodiment, determining a Vulnerability coefficient for a data location could include the age of the data, how often the data is accessed, what firewalls the data is behind, and the like. In some instances, the CSR scoring system 40 could use a time-based Vulnerability coefficient, which could include an estimate of how soon a cyberattack could be expected to penetrate a particular data location as part of the location's CSR score.

Instead of determining the Vulnerability coefficients solely based on attributes of a single data location, in some embodiments the IT infrastructure could be modeled as a network graph, to incorporate risk contributions from multiple data locations being compromised in a single or subsequent exfiltration attack. In some instances, the Value coefficients might be weighted based on which individuals the sensitive data was associated with, whether it was duplicate information, and how many other types of sensitive data were associated with that individual on the same or adjacent data locations. For example, it may be more costly to the organization for an attacker to have both someone's address and credit card number, and the value of having both may be greater than the sum of the individual values of the address and credit card number, increasing the Value coefficients associated with both datatypes.

Organizations can use the system 40 to benchmark themselves, both internally and in comparison to other organizations, as they conduct data remediation and try to improve their CSR scores relative to preset thresholds. In some embodiments, anonymous data can be collected from multiple organizations and the system 40 can be used to benchmark an organization against others—against other organizations in the same industry or against other similarly situated organizations, for example. The presently disclosed techniques may also or instead be used to provide a ransomware or disruption of access risk score that may be different than the data exfiltration risk score.

Figure 3:
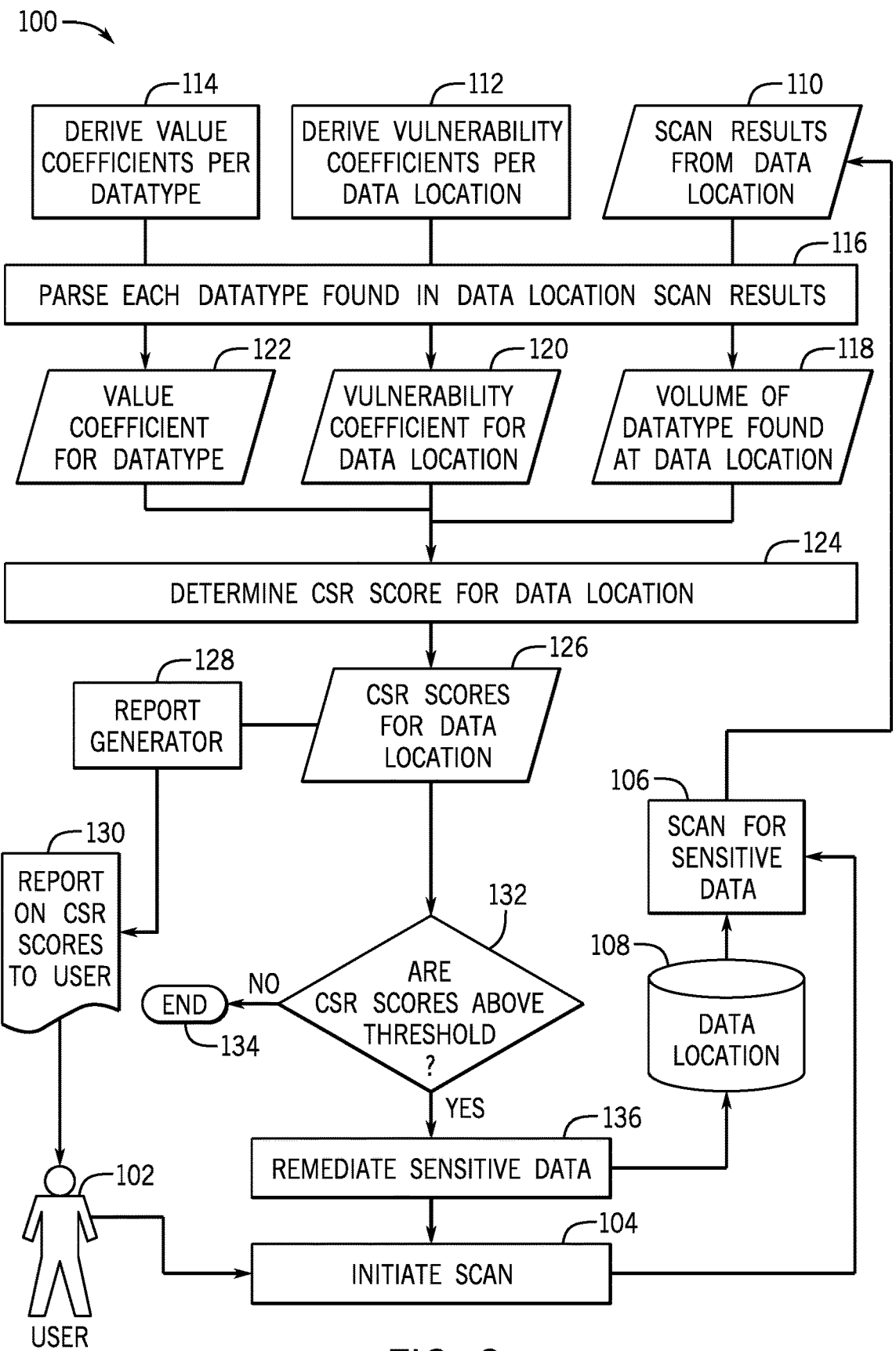
FIG. 3 is a flowchart representing a method for determining cybersecurity risk for data locations in accordance with one embodiment.

A method for determining cybersecurity risk for data locations (e.g., locations in an organization's IT infrastructure) is represented by flowchart 100 in FIG. 3 in accordance with one embodiment. This method may be implemented via the system 40 or in any other suitable manner. In this depicted embodiment, a user 102 (e.g., the user 64 of FIG. 2) can initiate (block 104) a scan (block 106) for sensitive data stored in one or more data locations 108, such as by using the sensitive data scanner 42 (FIG. 2). The sensitive data scanner 42 can scan the data storage of the data locations 108 and save scan results 110 (e.g., in computer storage 50). The depicted method includes deriving Vulnerability and Value coefficients (blocks 112 and 114), such as described above. Each datatype found during the sensitive data scan can be parsed (block 116), and the Volume 118 of the datatype found, the Vulnerability coefficient 120 for the data location, and the Value coefficient 122 for the datatype are used to determine a CSR score 124. In some embodiments, the Volume 118 is the number of items of that datatype found by the scan of the data location, the Vulnerability coefficient 120 represents the probability of data loss or theft from the data location given the security measures taken, and the Value coefficient 122 represents the cost per loss of sensitive data items for that datatype. And in at least some instances, the method includes multiplying the Value coefficient 122 of the datatype by the Vulnerability coefficient 120 for the data location and by the Volume 118 of the datatype, and normalizing values to a standard scale to create the CSR score for a data location.

A cumulative CSR score for one or more data locations 108 could be determined in any suitable manner. The CSR scores for different datatypes could be averaged (which could include calculating a weighted average of the scores) across all datatypes found at the scanned data location 108, for instance. CSR scores across one or multiple data locations 108 can be used by a report generator 128 to generate a score report 130 for the user 102.

Further, in some embodiments the CSR scores (whether individual or cumulative) are used for data remediation. As depicted in FIG. 3, for instance, the CSR scores (e.g., individual or cumulative) are compared (block 132) to one or more risk threshold values. If the CSR scores are below the threshold, the process may end (block 134). But if a CSR score is at or above the threshold, sensitive data at a location 108 may be remediated (block 136), such as described above or in any other suitable manner. Another sensitive data scan may be initiated (block 104) to collect new scan results 110 reflecting the remediation (e.g., removal or encryption) of sensitive data. This process of remediating and scanning may be reiterated until the CSR scores are below the desired threshold values. The one or more risk threshold values may take any suitable form. In some instances, such as when a monetary Value coefficient used to determine a CSR score, a CSR score may be a monetary CSR score and a risk threshold value may be a monetary threshold. In other instances, a CSR score and risk threshold value may be non-monetary values. Whether in monetary or non-monetary form, the one or more risk threshold values can be defined by a user or set in any other suitable fashion.

Figure 6:
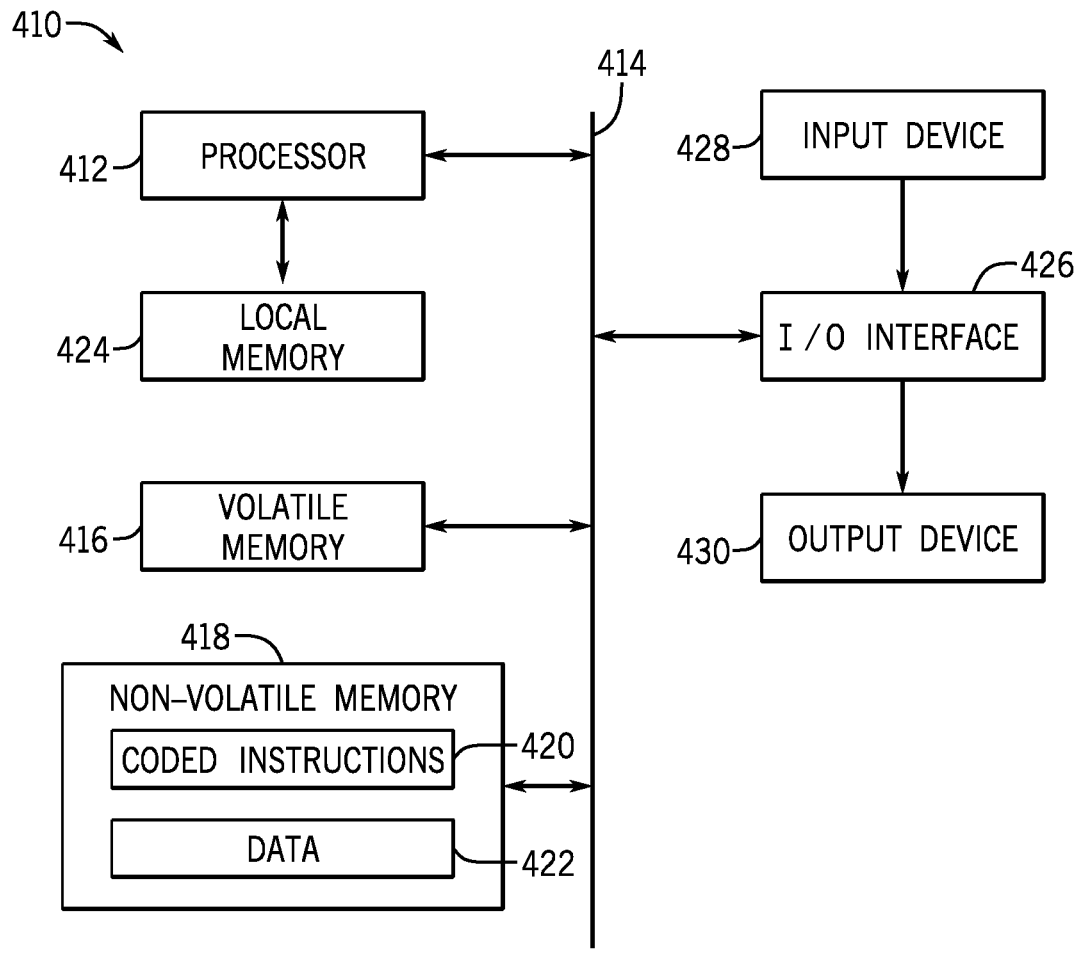
FIG. 6 is a block diagram of components of a programmed computer system for determining a cybersecurity risk score in accordance with one embodiment.

Finally, those skilled in the art will appreciate that the CSR scoring system can be embodied in a computer programmed to facilitate performance of the above-described processes. One example of such a computer is generally depicted in FIG. 6 in accordance with one embodiment. In this example, a computer system 410 includes a processor 412 connected via a bus 414 to volatile memory 416 (e.g., random-access memory) and non-volatile memory 418 (e.g., a hard drive, flash memory, or read-only memory (ROM)). Coded application instructions 420 and data 422 are stored in the non-volatile memory 418. The instructions 420 and the data 422 may also be loaded into the volatile memory 416 (or in a local memory 424 of the processor) as desired, such as to reduce latency and increase operating efficiency of the computer 410. The coded application instructions 420 can be provided as software that may be executed by the processor 412 to enable various functionalities described herein. Non-limiting examples of these functionalities include providing a user interface and calculating a numeric CSR score based on sensitive data value, volume, and vulnerability, such as described above. In at least some embodiments, the application instructions 420 are encoded in a non-transitory computer readable storage medium, such as the volatile memory 416, the non-volatile memory 418, the local memory 424, or a portable storage device (e.g., a flash drive or a compact disc).

An interface 426 of the computer system 410 enables communication between the processor 412 and various input devices 428 and output devices 430. The interface 426 can include any suitable device that enables this communication, such as a modem or a serial port. In some embodiments, the input devices 428 include a keyboard and a mouse to facilitate user interaction, while the output devices 430 include displays, printers, and storage devices that allow output of data received or generated by the computer system 410. Input devices 428 and output devices 430 may be provided as part of the computer system 410 or may be separately provided. It will be appreciated that computer system 410 may be a distributed system, in which some of its various components are located remote from one another, in some instances.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A computer-implemented method for determining a cybersecurity risk score of information technology (IT) infrastructure, the method comprising:
   receiving results from a sensitive data scan of IT infrastructure of an organization, the results including indications of a volume of sensitive data found during the scan, types of the sensitive data found during the scan, and locations at which the sensitive data was found during the scan; and
   determining a cybersecurity risk score for the IT infrastructure of the organization, wherein determining the cybersecurity risk score includes calculating the cybersecurity risk score based on the volume of sensitive data found during the scan, value of the sensitive data found during the scan, and vulnerability of the locations at which the sensitive data was found during the scan; and wherein the value of the sensitive data found during the scan represents relative worth to the organization of the sensitive data, determining the cybersecurity risk score includes parsing out data from the results of the sensitive data scan and applying weighting coefficients in calculating the cybersecurity risk score, and the weighting coefficients applied include vulnerability coefficients for the locations at which the sensitive data was found during the scan and value coefficients for the types of the sensitive data found during the scan.

2. The computer-implemented method of claim 1, comprising performing remediation to reduce cybersecurity risk to the IT infrastructure.

3. The computer-implemented method of claim 2, wherein performing remediation to reduce cybersecurity risk to the IT infrastructure includes removing one or more items of sensitive data from a location at which the one or more items of sensitive data were found during the scan.

4. The computer-implemented method of claim 2, wherein performing remediation to reduce cybersecurity risk to the IT infrastructure includes encrypting one or more items of sensitive data found during the scan.

5. The computer-implemented method of claim 2, comprising determining an updated cybersecurity risk score for the IT infrastructure following the remediation.

6. The computer-implemented method of claim 1, comprising determining the vulnerability coefficients.

7. The computer-implemented method of claim 1, comprising determining the value coefficients.

8. The computer-implemented method of claim 1, comprising performing the sensitive data scan of the IT infrastructure of the organization.

9. An apparatus comprising:
a processor-based computer system including a memory and a processor, the memory having computer-readable instructions that, when executed, cause the computer system to:
receive results from a sensitive data scan of information technology (IT) infrastructure of an organization, the results including indications of a volume of sensitive data found during the scan, types of the sensitive data found during the scan, and locations at which the sensitive data was found during the scan;
determine a cybersecurity risk score for the IT infrastructure of the organization, wherein determining the cybersecurity risk score includes calculating the cybersecurity risk score based on the volume of sensitive data found during the scan, value of the sensitive data found during the scan, and vulnerability of the locations at which the sensitive data was found during the scan; and wherein the value of the sensitive data found during the scan represents relative worth to the organization of the sensitive data, determining the cybersecurity risk score includes parsing out data from the results of the sensitive data scan and applying weighting coefficients in calculating the cybersecurity risk score, and the weighting coefficients applied include vulnerability coefficients for the locations at which the sensitive data was found during the scan and value coefficients for the types of the sensitive data found during the scan;
compare the cybersecurity risk score to a threshold value;
based on the comparison of the cybersecurity risk score to the threshold value, remediate one or more items of sensitive data found at one or more locations during the scan; and
after remediating the one or more items of sensitive data found at the one or more locations during the scan, determine an updated cybersecurity risk score for the IT infrastructure of the organization.

10. The apparatus of claim 9, wherein the memory has computer-readable instructions that, when executed, cause the computer system to receive a user-defined monetary threshold and to set the threshold score value to the user-defined monetary threshold.

11. The apparatus of claim 9, wherein the computer-readable instructions that, when executed, cause the computer system to remediate one or more items of sensitive data found at one or more locations during the scan include instructions that, when executed, cause the computer system to remove at least one item of sensitive data of the one or more items of sensitive data from at least one location of the one or more locations.

12. The apparatus of claim 9, wherein the computer-readable instructions that, when executed, cause the computer system to remediate one or more items of sensitive data found at one or more locations during the scan include instructions that, when executed, cause the computer system to encrypt at least one item of sensitive data of the one or more items of sensitive data.

13. The apparatus of claim 9, wherein the memory has computer-readable instructions that, when executed, cause the computer system to output a cybersecurity risk score report to a user.

14. The apparatus of claim 9, wherein the memory is a non-volatile storage.

15. A non-transitory computer-readable medium encoded with instructions that, when executed by a processor of a computer system, cause the computer system to:
receive results from a sensitive data scan of information technology (IT) infrastructure of an organization, the results including indications of a volume of sensitive data found during the scan, types of the sensitive data found during the scan, and locations at which the sensitive data was found during the scan;
determine a cybersecurity risk score for the IT infrastructure of the organization, wherein determining the cybersecurity risk score includes calculating the cybersecurity risk score based on the volume of sensitive data found during the scan, value of the sensitive data found during the scan, and vulnerability of the locations at which the sensitive data was found during the scan; and wherein the value of the sensitive data found during the scan represents relative worth to the organization of the sensitive data, determining the cybersecurity risk score includes parsing out data from the results of the sensitive data scan and applying weighting coefficients in calculating the cybersecurity risk score, and the weighting coefficients applied include vulnerability coefficients for the locations at which the sensitive data was found during the scan and value coefficients for the types of the sensitive data found during the scan;
compare the cybersecurity risk score to a threshold value;
based on the comparison of the cybersecurity risk score to the threshold value, remediate one or more items of sensitive data found at one or more locations during the scan; and
after remediating the one or more items of sensitive data found at the one or more locations during the scan, determine an updated cybersecurity risk score for the IT infrastructure of the organization.

* * * * *